(12) United States Patent
Wiebeck et al.

(10) Patent No.: US 12,077,118 B2
(45) Date of Patent: Sep. 3, 2024

(54) LOCKING DEVICE FOR A SAFETY BAR, PASSENGER ACCOMMODATION AND AMUSEMENT RIDE HAVING A LOCKING DEVICE OF THIS KIND

(71) Applicant: MACK RIDES GMBH & CO. KG, Waldkirch (DE)

(72) Inventors: Dirk Wiebeck, Vogtsburg (DE); Michael Kraus, Ehrenkirchen (DE)

(73) Assignee: MACK RIDES GMBH & CO. KG, Waldkirch (DE)

( * ) Notice: Subject to any disclaimer, the term of this patent is extended or adjusted under 35 U.S.C. 154(b) by 376 days.

(21) Appl. No.: 17/609,621

(22) PCT Filed: Jan. 23, 2020

(86) PCT No.: PCT/EP2020/051622
§ 371 (c)(1),
(2) Date: Nov. 8, 2021

(87) PCT Pub. No.: WO2020/224812
PCT Pub. Date: Nov. 12, 2020

(65) Prior Publication Data
US 2022/0227321 A1    Jul. 21, 2022

(30) Foreign Application Priority Data
May 9, 2019   (DE) .......................... 102019112190.6

(51) Int. Cl.
*B60R 21/02*    (2006.01)
*B60R 21/01*    (2006.01)
(Continued)

(52) U.S. Cl.
CPC ............ *B60R 21/026* (2013.01); *B60R 21/01* (2013.01); *A63G 4/00* (2013.01); *A63G 9/00* (2013.01);
(Continued)

(58) Field of Classification Search
CPC ......... B60R 21/026; B60R 21/01; A63G 4/00; A63G 31/00; A63G 1/00
(Continued)

(56) References Cited

U.S. PATENT DOCUMENTS 6,019,392 A   2/2000   Karlow
6,152,488 A   11/2000  Hedderly et al.
(Continued)

FOREIGN PATENT DOCUMENTS

DE         69621138 T2    11/2002
DE      102107126488 B3     2/2019
(Continued)

OTHER PUBLICATIONS

First Office Action issued Feb. 15, 2023, in corresponding Chinese application No. CN 202080033986.6.
(Continued)

*Primary Examiner* — Kien T Nguyen
(74) *Attorney, Agent, or Firm* — Nath, Goldberg & Meyer; Jerald L. Meyer

(57) ABSTRACT

A locking device (1) for a safety bar (8) includes a fluid channel (10) having a magneto-rheological fluid (11), a movable locking element (40) and a magnet device (30), wherein the locking element (40) is coupled to the safety bar (8) and forces the fluid (11) through the fluid channel (10) when the safety bar (8) moves, wherein the fluid channel (10) has at least one channel portion (20), and wherein the magnet device (30) is arranged at least on opposing side walls (21) of the channel portion (20) in such a manner that the field lines (31) of the magnetic field of the magnet device (30) can pass through the channel portion (20). A passenger accommodation has a safety bar (8) and a locking device (1) and an amusement ride having has a locking device (1).

18 Claims, 12 Drawing Sheets

(51) Int. Cl.
  *A63G 4/00* (2006.01)
  *A63G 9/00* (2006.01)
  *A63G 31/00* (2006.01)
  *B60R 21/00* (2006.01)

(52) U.S. Cl.
  CPC .... *A63G 31/007* (2013.01); *B60R 2021/0097* (2013.01)

(58) Field of Classification Search
  USPC ...................................... 472/43–47, 117–125
  See application file for complete search history.

(56) References Cited

U.S. PATENT DOCUMENTS

| | | | |
|---|---|---|---|
| 9,841,078 | B2 | 12/2017 | Battlogg et al. |
| 2001/0048362 | A1* | 12/2001 | Spencer ............... B62D 15/029 340/425.5 |
| 2007/0200208 | A1 | 8/2007 | Wang |
| 2013/0060428 | A1 | 3/2013 | Battlogg et al. |

FOREIGN PATENT DOCUMENTS

| | | |
|---|---|---|
| EP | 1964598 A2 | 9/2008 |
| FR | 2815990 A1 | 5/2002 |
| JP | 2022-529312 | 9/2002 |

OTHER PUBLICATIONS

Letter (in English) from Chinese associate regarding 1st. Office Action.
Wikipedia, "Magnetorheologische Flussigkeit" Apr. 29, 2019.
German Office Action for 10 2019 112 190.6 dated Mar. 23, 2020.
Office action issued Jan. 17, 2023, for parallel Japanese application No. 2021-565949, with English translation.

* cited by examiner

LOCKING DEVICE FOR A SAFETY BAR, PASSENGER ACCOMMODATION AND AMUSEMENT RIDE HAVING A LOCKING DEVICE OF THIS KIND

This is a National Phase Application filed under 35 U.S.C. 371 as a national stage of PCT/EP2020/051622, filed Jan. 23, 2020, an application claiming the benefit of German Application No. 10 2019 112 190.6 filed May 9, 2019, the content of each of which is hereby incorporated by reference in its entirety.

The present invention relates to a locking device for a safety bar, comprising a fluid channel having a magneto-rheological fluid and a locking element with the features of claim 1, a passenger accommodation with the features of claim 17 and an amusement ride with the features of claim 18.

Safety bars with locking devices are known from prior art in various embodiments. Amusement rides of this kind are, for example, roller coasters in which passengers are subjected to strong accelerations. While traveling on an amusement ride, passengers are held in their passenger accommodation by a safety bar and the safety bar is locked via a locking system. According to standard DIN EN 13814, depending on the acceleration that acts on the passenger, a corresponding locking system is prescribed.

To get in and out of the passenger accommodation, the safety bars are typically pivoted about an axis of rotation by means of actuators. During the ride, however, the safety bar is locked by means of a mechanical lock in such a way that said bar remains in the closed position even in the event of a failure of the actuator.

The disadvantage of prior art is that the known mechanical locks are subjected to heavy wear due to the constant use and load and are therefore costly to maintain. Mechanical locks are also associated with additional weight, which means that greater energy expenditure is required for acceleration due to higher vehicle weights.

Hydraulic locking devices or actuators with a conventional hydraulic valve have the disadvantage of causing valve leakage at high pressure differences, which reduces the locking or actuating force of the locking devices or actuators and increases the need for maintenance.

This is where the present invention begins.

It is therefore the object of the present invention to propose an improved locking device for a safety bar, which expediently improves the locking devices known from prior art and is both fail-safe and unsusceptible to leakage and wear.

According to the invention, these objects are achieved by a locking device for a safety bar with the features of claim 1, a passenger accommodation having a locking device according to claim 17 and by an amusement ride with the features of claim 18.

Further advantageous embodiments of the present invention are specified in the dependent claims.

The locking device for a safety bar with the features of claim 1 has a fluid channel having a magneto-rheological fluid, a movable locking element and a magnet device, the locking element forcing the fluid through the fluid channel when there is a movement. The locking element is therefore in a kinematic operative connection to the magneto-rheological fluid and is thus hydraulically coupled to the magneto-rheological fluid and can transfer a movement or pivot movement of the safety bar to the magneto-rheological fluid in the fluid channel. In addition, the fluid channel has at least one channel portion, wherein the magnet device is arranged at least on two opposing side walls of the channel portion in such a manner that the magnetic field lines of the magnetic field of the magnet device can pass through the channel portion. The magnetic field lines of the magnetic field of the magnet device preferably pass through the channel portion transversely to a flow direction, wherein naturally by the curvature of the field lines and in the form of a preferred development—as will be explained in detail later—the field lines can be aligned so as to be specifically inclined or curved with respect to the flow direction in the channel portion. The magneto-rheological fluid is polarized in the magnetic field of the magnet device, as a result of which the particles of the magneto-rheological fluid align or are polarized in the magnetic field of the magnet device along the field lines, i.e., transversely to the flow direction. As a result, the viscosity of the magneto-rheological fluid in the channel portion is preferably increased up to a pressure-resistant solidification and the fluid channel, and thus the safety bar is blocked or a movement of the safety bar is greatly damped.

Here and in the following, a fluid channel is understood to mean an open or closed system that forcibly conveys the fluid—with as little leakage as possible. The fluid channel can preferably form a closed circle, i.e., a fluid circuit, or form a system that has at least one first end and at least one second end, there being at least one connection between the at least one first end and the at least one second end, by means of which connection the fluid can flow from the at least one first end to the at least one second end.

According to a development of the invention, the magnet device has a first state and a second state, wherein the magnetic field lines pass through the channel portion in the first state and wherein the magnetic field lines are diverted or deflected by the channel portion or weakened in the channel portion in the second state. The second state thus corresponds to the state in which the magnetic field of the magnet device is weakened or minimized in the channel portion, as a result of which the viscosity of the magneto-rheological fluid remains substantially unchanged and the magneto-rheological fluid flows through, or can flow through, the channel portion through the magnet device in the flow direction approximately without interference. The safety bar is released in the second state and can be moved or pivoted.

According to a further advantageous embodiment of the present invention, the magnet device surrounds the channel portion at least in some portions. It is particularly preferred if the channel portion has a circular cross section, so that the magnet device is arranged rotationally symmetrically, in particular completely rotationally symmetrically, around the channel portion. It is preferred in particular if the magnet device can be divided in the circumference into at least two regions, it being possible for the first region to form a north pole and the second region to form a south pole. Accordingly, the magnetic flux flows along the field lines from the north pole to the south pole, thereby passing through the channel portion of the fluid channel.

According to a further advantageous embodiment of the present invention, the magnet device can be switched or actuated mechanically and/or electrically. Mechanically, the magnetic field of the magnet device can be weakened, for example by deflecting the magnetic flux by means of flux-conducting components, and/or can be weakened by mechanically introducing a magnetically hard object. A switchable electromagnet can also be provided, which either generates the magnetic field of the magnet device and/or weakens the magnetic field of the magnet device.

It has proven to be particularly advantageous if the magnet device has at least one permanent magnet and/or at least one electromagnet. The magnet device can preferably be formed from a plurality of permanent magnets, in particular neodymium magnets, which can be arranged simply and inexpensively on the at least two opposing side walls of the channel portion of the fluid channel.

According to a further advantageous embodiment of the present invention, the channel portion has at least one throttle, by means of which the channel portion of the fluid channel has a locally reduced cross section. It is particularly preferred if the cross section through the throttle is at most $\frac{1}{2}$, more preferably $\frac{1}{4}$, even more preferably $\frac{1}{8}$, also further preferably $\frac{1}{16}$, and even more preferably not more than $\frac{1}{32}$, of the cross-sectional area of the channel portion beyond the throttle. By locally reducing the cross section in the throttle through which the fluid flows, the polarized particles of the magneto-rheological fluid can "clog" the channel portion and block it against large pressures.

According to a further embodiment of the present invention, the at least one throttle can have a cascade, a link, a perforated sheet, a honeycomb structure, a sieve structure and/or a lattice structure. In particular, it is preferred if the throttle has a cascade by means of which the cross section through which the fluid flows is considerably reduced and additionally the effective length of the channel portion is extended in the flow direction due to deflections. The cascade can have any shape, for example a zigzag shape or a meandering shape. The cascade increases the blocking effect of the polarized particles of the magneto-rheological fluid and the fluid channel can be effectively blocked against large compressive forces.

Furthermore, the cascade or link can preferably be formed from a plurality of deflector profiles, which can protrude alternately from the at least two opposing side walls into the channel portion. The deflector plates can be made of a magnetizable or non-magnetizable material, the deflector plates being particularly preferably made of a magnetizable material, as a result of which the field lines are aligned particularly effectively between at least two opposing side walls.

A perforated sheet, a honeycomb structure, sieve structure or lattice structure divides the channel portion into a large number of individual channels, which can be blocked particularly well by the polarized particles of the magneto-rheological fluid. The perforated sheet, honeycomb structure, sieve structure and/or lattice structures can also be made of a magnetizable or non-magnetizable material, wherein it is particularly preferred in this case if the above-mentioned structures are made of a non-magnetizable material, preferably a light metal.

According to a further embodiment of the present invention, the channel portion can have a tapered portion in the form of a diffuser or a nozzle. Whereas a diffuser causes a delay of the flow in the channel portion, the nozzle accelerates the flow in the channel portion. In the present case, a channel portion designed as a diffuser corresponds to an expansion of the cross section through which the fluid flows and the nozzle corresponds to a taper of the cross section through which the fluid flows, transversely to the flow direction. The field lines of the magnet device can be aligned in the diffuser or in the nozzle as precisely as possible, perpendicular to the flow direction. When there is a delay in the diffuser, the static pressure increases, during which time the static pressure decreases in the nozzle due to acceleration. A one-way or non-return valve can be realized through the diffuser or through the nozzle, as a result of which the channel portion—in the presence of the magnetic field—is blocked in a first flow direction and allows flow in a second flow direction. The first flow direction corresponds to the flow direction that points in the direction of the tapering of the tapered portion.

Furthermore, it has proven to be advantageous if a tapered portion in the form of a diffuser and/or in the form of a nozzle is arranged upstream and/or downstream of the channel portion in the flow direction. The nozzle and/or the diffuser can particularly preferably reduce the cross section in the fluid channel upstream of the entry into the channel portion, as a result of which the cross section through which the fluid flows is small. The solidifications in the channel cross section that are generated by the magnetic field can also block the fluid channel against large pressure differences.

It has also proven to be advantageous if the locking element comprises a piston, wherein the piston is preferably designed to perform a linear movement. The piston can be coupled or connected to the safety bar by means of a piston rod. Furthermore, it is preferred if the fluid channel has a cylindrical pressure chamber in which the piston is arranged. The piston has a first pressure side and a second pressure side and divides the pressure chamber of the cylinder into two regions, namely a first region and a second region, wherein depending on the load on the piston, one of the regions forms a pressure side and the other region forms a suction side. The first region and the second region of the pressure chamber of the cylinder are preferably separated without leakage by means of a piston seal. The first region and the second region are connected to one another by means of the fluid channel, so that the magneto-rheological fluid enclosed in the pressure chamber can flow through the fluid channel from the first region, the pressure side, into the second region, the suction side, when the locking element moves.

Furthermore, a conventional hydraulic valve can be arranged in the fluid channel. The valve can additionally secure the fluid channel and mechanically block the connection between the two pressure sides of the piston. Furthermore, the channel portion can be arranged in the fluid channel with respect to the hydraulic valve in such a way that the pressure in the channel portion is lowered to such an extent that the pressurization of the hydraulic valve is lowered even at extremely high pressures and leaks are prevented.

Furthermore, it has proven to be advantageous if the fluid channel is a circular channel, wherein the circular channel is arranged between a circular, preferably circular-cylindrical inner shaft, which forms the first side wall, and a circular, preferably hollow-cylindrical outer shaft, which forms the opposite second side wall. The inner shaft, the outer shaft and the circular channel can be arranged coaxially with a longitudinal axis. Furthermore, the magnet device can be arranged in such a way that the field lines extend substantially radially and pass through the circular channel. The inner shaft preferably forms the locking element and can be rotated about the longitudinal axis relative to the outer shaft. When the locking element, or the safety bar, moves, the movement is transferred to the magneto-rheological fluid in the circular channel, or through the fluid channel, and the magneto-rheological fluid is forced into a flowing movement.

It has proven to be advantageous if at least one rolling element is arranged in the fluid channel. The rolling element is in operative contact with both the inner shaft and the outer shaft and is forced into a rolling movement when the inner shaft is rotated relative to the outer shaft. It is particularly preferred if the fluid channel is designed as a circular channel with a constant width, as a result of which a kind of roller bearing is formed. The field lines of the magnetic field of the magnet device polarize the particles of the magneto-rheological fluid and preferably align them radially in the circular channel Due to a wedge effect, the polarized particles block a rolling movement of the rolling elements and a block a rotation of the locking element. When the magnetic flux or the field lines are deflected or weakened in the circular channel, the rolling elements or the actuator formed as an inner shaft are released and the inner shaft can be rotated with respect to the outer shaft.

According to a further embodiment of the present invention, the inner shaft is mounted eccentrically within the outer shaft, as a result of which the circular channel does not have a constant channel cross section around the circumference. The inner shaft forms the locking element and is arranged within the outer shaft in the manner of an eccentric disk pump and forms a constriction at a circumferential position, which constriction is moved about the longitudinal axis of the inner shaft together with a rotation of the inner shaft in order to displace the magneto-rheological fluid. The polarized particles of the magneto-rheological fluid form chain-like structures along the field lines of the magnetic field of the magnet device, which structures, by means of the wedge effect of the constriction, block the relative position between the inner shaft and the outer shaft and thus block the safety bar.

According to a further advantageous embodiment of the present invention, the fluid channel has a conveying means which allows the magneto-rheological fluid to be pressurized in the fluid channel or allows said fluid to flow through the fluid channel. The conveying means is preferably a pump which is designed to adjust and maintain the pressure in the fluid channel and, optionally, to adjust a flow in the fluid channel in order to advance the movable locking element.

It has also proven to be advantageous if the fluid channel has at least one pressure compensation device, by means of which the pressure in the fluid channel is maintained and pressure fluctuations, for example due to volume changes or temperature fluctuations, can be compensated for. It is particularly advantageous if the pressure compensation device has a compensation reservoir connected to the fluid channel, in which reservoir the magneto-rheological fluid is stored proportionally, and a pressure medium. The pressure medium can preferably be a compressible gas, in particular nitrogen or a nitrogen mixture. This ensures that a substantially constant pressure is always maintained in the fluid channel under different ambient conditions.

The pressure compensation device can further preferably be an energy store. When the safety bar is closed, the energy store is charged due to the different volumes in the first region and in the second region of the pressure chamber—on account of the piston rod in the second region. Accordingly, when the safety bar is closed, the pressure in the magneto-rheological fluid increases and this stored energy can be used in the second state of the magnet device for opening the safety bar.

The magneto-rheological fluid preferably comprises polarizable particles, in particular carbonyl iron powder, and a suspension, in particular a mineral oil, a synthetic oil, ethylene glycol or water, wherein the foregoing list of ingredients of the magneto-rheological fluid is not exhaustive. Rather, any polarizable particles and any suspensions can be used. The above-mentioned combinations are merely an exemplary and preferred combination.

In the following, two exemplary embodiments of a locking device according to the invention and developments thereof are described in detail with reference to the accompanying drawings. In the drawings:

FIG. 1 shows a passenger accommodation of an amusement ride having a safety bar, wherein the safety bar can be locked by a locking device according to the invention;

FIG. 2 shows an enlarged representation of the locking device for a safety bar according to FIG. 1, comprising a fluid channel having a magneto-rheological fluid, a movable locking element designed as a piston and comprising a magnet device, wherein the magnet device is arranged at least around a channel portion of the fluid channel and the field lines of the magnet device passing through the channel portion in such a way that the magneto-rheological fluid in the channel portion can be polarized in order to block the channel portion transversely to the flow direction;

FIG. 11a shows a first development of the second exemplary embodiment according to FIG. 9 or 10;

FIG. 11b shows a detailed representation according to FIG. 11a;

FIG. 12a shows a second development of the second exemplary embodiment according to FIG. 9 or 10;

FIG. 12b shows a detailed representation according to FIG. 12a;

FIG. 13b shows a schematic sectional representation of the channel portion along the intersection line X-X according to FIG. 13a;

Identical or functionally identical components are identified below with the same reference symbols. Identical features of the individual exemplary embodiments and their developments can be combined with one another and are not limited to the respective exemplary embodiments.

Figure 1:
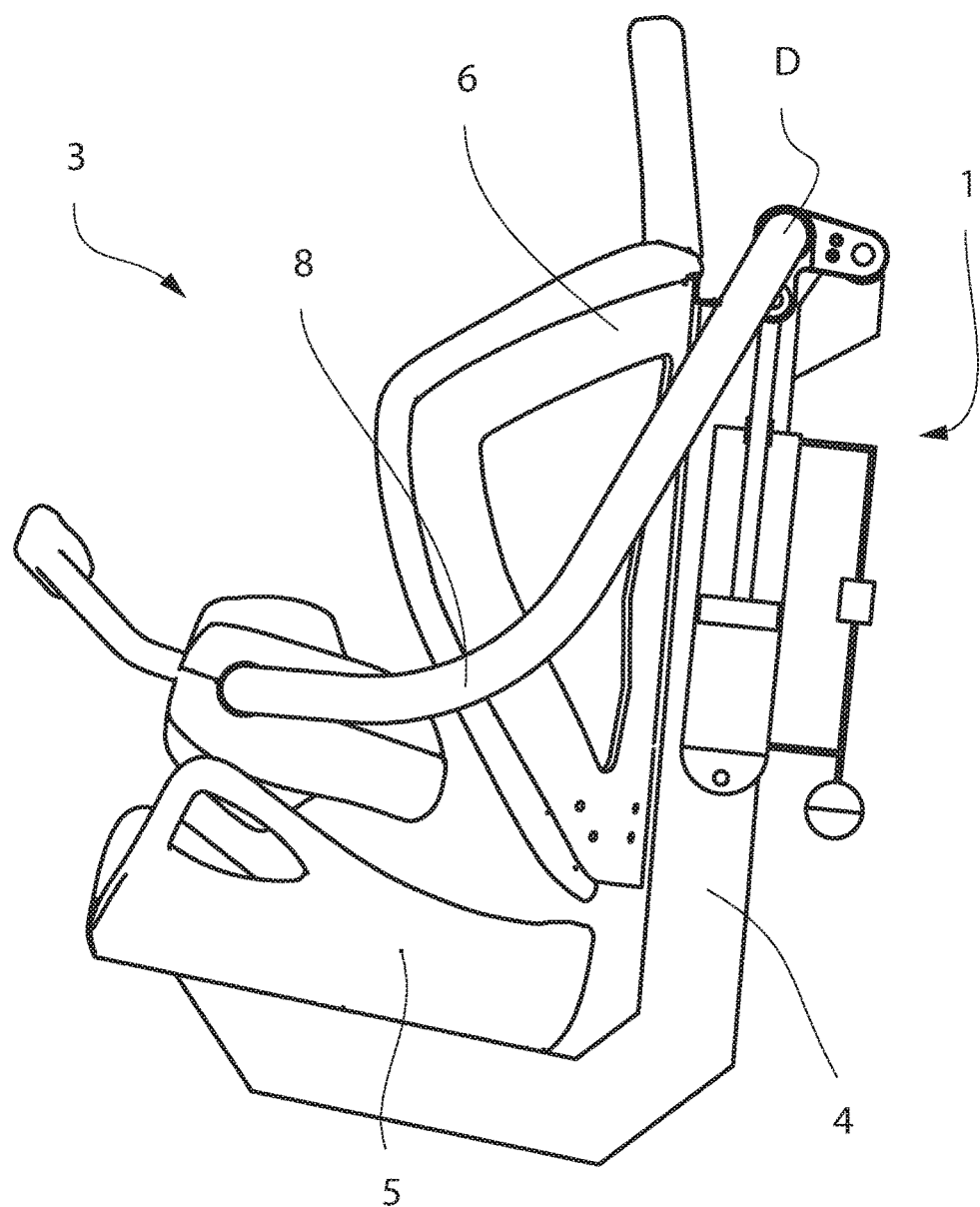

FIG. 1 shows a passenger accommodation 3 of an only partially shown amusement ride 2, comprising a seat receptacle 4, a seat cushion 5, a back cushion 6 and a safety bar 8, which is arranged on the seat receptacle 4 so as to pivot or rotate about an axis of rotation. The safety bar 8 can be moved from an open position (not shown) to a closed position in order to keep a passenger (not shown) safely in the passenger accommodation 3 while traveling on the amusement ride 2. The safety bar 8 can be moved from the open position to the closed position and vice versa manually or by corresponding actuators and can also have a locking system as a primary safeguard, whereby the safety bar 8 is held in the closed position while traveling. In the event that the actuators or the primary safeguard of the safety bar 8 fails, a locking device 1 is provided as a secondary safeguard, by means of which the safety bar 8 is held in the closed position. Alternatively, the locking device 1 can form the primary safeguard of the safety bar 8.

Figure 2:
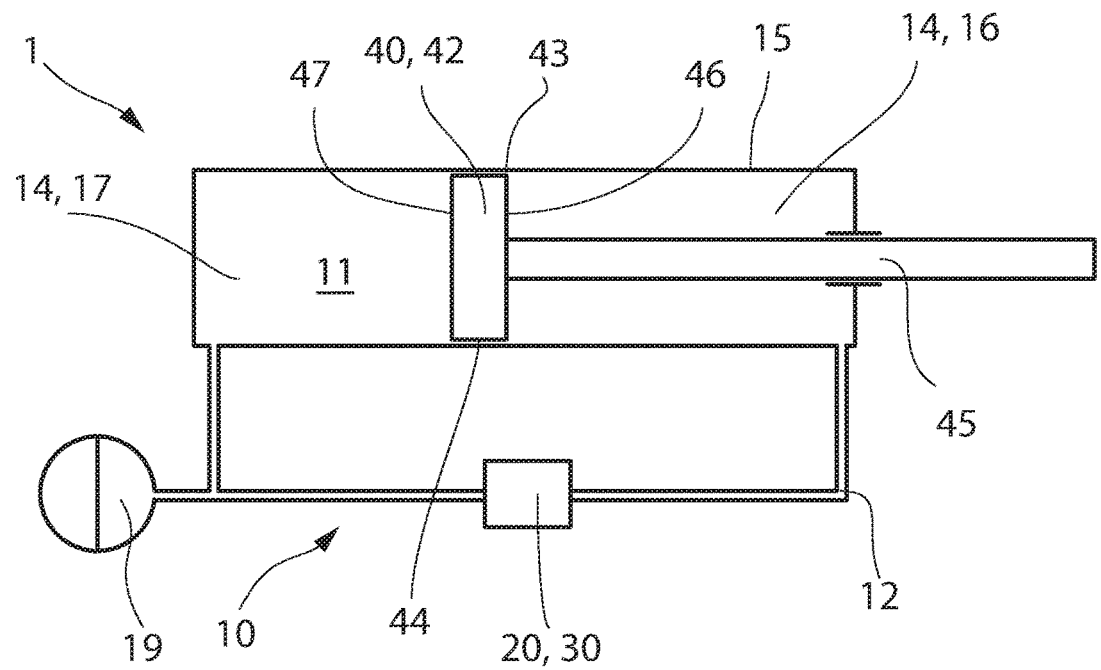

FIG. 2 shows an enlarged representation of the locking device 1 according to the invention for a safety bar 8 according to FIG. 1, comprising a fluid channel 10 having a channel portion 20, a magnet device 30 and a movable locking element 40, wherein the locking element 40 is coupled to the safety bar 8 at one end and transfers a movement of the safety bar 8 to a magneto-rheological fluid 11 located in the fluid channel 10.

The fluid channel 10 is filled with the magneto-rheological fluid 11, the magneto-rheological fluid 11 comprising at least two components, specifically a suspension and polarizable particles. The suspension can preferably be a mineral oil, a synthetic oil, ethylene glycol or water, it being possible to use any suspension that does not chemically react with the polarizable particles and the materials used for the locking device 1. The polarizable particles may contain carbonyl iron powder or the like. The magneto-rheological fluid may additionally contain stabilizers.

In the exemplary embodiment shown, the fluid channel 10 is a self-contained fluid circuit and comprises a cylinder 15 in which the locking element 40, which is designed as a piston 42, is arranged. The cylinder 15 surrounds a pressure chamber 14 and the piston 42 divides the pressure chamber 14 of the cylinder 15 into a first region 16 and a second region 17. Depending on the load on the pressure chamber 14, one of the regions 16, 17 forms the pressure side and the other region 16, 17 forms the suction side. The first region 16 and the second region 17 communicate with each other by means of a line 12 of the fluid channel 10 and the magneto-rheological fluid 11 can flow through the line 12 from the pressure side to the suction side—as is shown in FIGS. 13a to 17—in a first flow direction A and can flow back again in a second flow direction B.

The locking element 40 is held in the cylinder 15 so as to be linearly movable and is coupled to the magneto-rheological fluid 11 enclosed in the fluid channel 10. A movement of the safety bar 8 is transferred by the locking element 40 or by the piston 42 to the magneto-rheological fluid 11, as a result of which said fluid is displaced from the pressure side of the piston 42 through the fluid channel 10 or through the line 12 in one of the flow directions A, B to the piston 42.

The piston 42 may have a seal 44 which seals a pass gap 43 between the piston 42 and a wall of the cylinder 15. By means of a piston rod 45, the piston 42 is connected to the safety bar 8, see FIG. 1, of the passenger accommodation 3, the piston rod 45 being arranged preferably coaxially in the cylinder 15 and being led out of the cylinder 15 at a free end through an opening in the cylinder 15. The opening in the cylinder 15 can also be sealed by means of a seal in order to prevent leakage.

In addition, the fluid channel 10 comprises a pressure compensation device 19 which can keep the pressure in the fluid channel 10 approximately constant.

The pressure compensation device 19 can have a reservoir in which a pressure medium and the magneto-rheological fluid 11 are stored. The pressure medium pressure pressurizes the magneto-rheological fluid 11 and can, for this purpose, be a compressible medium, in particular a gas, even more preferably nitrogen or a nitrogen mixture. Different volumes from pressure side to suction side in the cylinder 15 as well as different volumes due to fluctuations in the ambient conditions, in particular the temperature, can be compensated for by the pressure compensation device 19. The pressure compensation device 19 can also be used as an energy store which stores energy in the form of pressure in the manner of a spring accumulator and releases it again when required.

In the present case, when the safety bar 8 is closed, the magneto-rheological fluid 11 can be displaced from the second region 17 into the first region 16 of the pressure chamber 14. Due to the piston rod 45 of the piston 42, which rod is located in the first region 16, the volume enclosed in the fluid channel 11 is reduced and the pressure is increased. The magneto-rheological fluid 11 is forced into the pressure compensation device 19 and the pressure medium, for example the compressible gas, is preloaded. This preload can be used for opening the safety bar 8, whereby the passenger, after traveling on the amusement ride 2, has to apply less force in order to swing open the safety bar 8.

In the exemplary embodiment shown in FIG. 2, the channel portion 20 is arranged in the line 12 between the first region 16 and the second region 17 of the pressure chamber 14 and can be designed as shown by way of example in FIGS. 13a to 17. It is essential here that the magnet device 30 is arranged on at least two opposing side walls 21, 22 of the channel portion 20 in such a way that the field lines 31 of the magnetic field of the magnet device 30 can pass through the channel portion 20. For improved understanding, the field lines 31 are shown in an idealized way in FIG. 13b in the form of arrow lines.

The magnet device has a first state and a second state. In the first state of the magnet device 30, the magnetic field lines 31 of the magnetic field of the magnet device 30 pass through the channel portion 20 and polarize the particles of the magneto-rheological fluid 11 in order to align them approximately transversely to the flow directions A, B in the channel portion 20.

Due to the reluctance force, also called Maxwell's force, the polarized particles of the magneto-rheological fluid 11 form chain-like solidifications which extend along the magnetic field lines 31. The solidifications result in increased viscosity, culminating in the formation of rigid or pressure-resistant solidifications, as a result of which the channel portion 20 is blocked in the first state and the movable locking element 40 or the piston 42 is fixed in its position. The blocking of the channel portion 20 can be pressure-resistant and block against pressures of more than 10 bar, 25 bar, 50 bar, 100 bar, 200 bar or more.

In the second state of the magnet device 30, the magnetic flux of the magnetic field is either deflected in such a way that it does not passes through the channel portion 20 or only passes through it in a weakened form. This can be done, for example, by deflecting around the channel portion 20 by means of a magnetically soft conductor. Alternatively, the magnetic field of the magnet device 30 can be weakened by a second magnet unit 32—see FIG. 13b. This can occur by virtue of the magnetic fields of the magnet device 30 and the second magnet unit 32 canceling each other out or weakening each other at least in the region of the channel portion 20. In this second state, the magneto-rheological fluid 11 can flow unhindered through the channel portion 20 and the safety bar 8 can be opened. In this state, a passenger can take a seat on the passenger accommodation 3 or get off after traveling on the amusement ride 2.

The magnet device 30 can preferably have at least one permanent magnet 35, with neodymium magnets being particularly preferably used. Furthermore, it is preferred for the magnet device 30 to completely surround the channel portion 20. In the case of a circularly symmetrical cross section of the channel portion 20, the magnet device 30 can be designed as a ring magnet with a diametric magnetization. By means of the permanently magnetic magnet device 30, the locking device 1 can be designed analogously to a "normally closed" valve, which ensures that the channel portion 20 is blocked in an unactuated first state and the safety bar 8 cannot be released.

The second magnet unit 32 can be provided for actuating the magnet device 30. The second magnet unit 32 can be arranged adjacent to the magnet device 30 and have at least one permanent magnet 35 and/or electromagnet 36.

According to an embodiment that is not shown, at least one permanent magnet of the second magnet unit 32 can weaken or cancel the magnetic field of the magnet device 30 depending on the position of said magnet. To actuate or switch the magnet device 30 from the first state to the second state, the polarity of the permanent magnet relative to the magnet device 30 can be changed or vice versa.

Figure 13A:
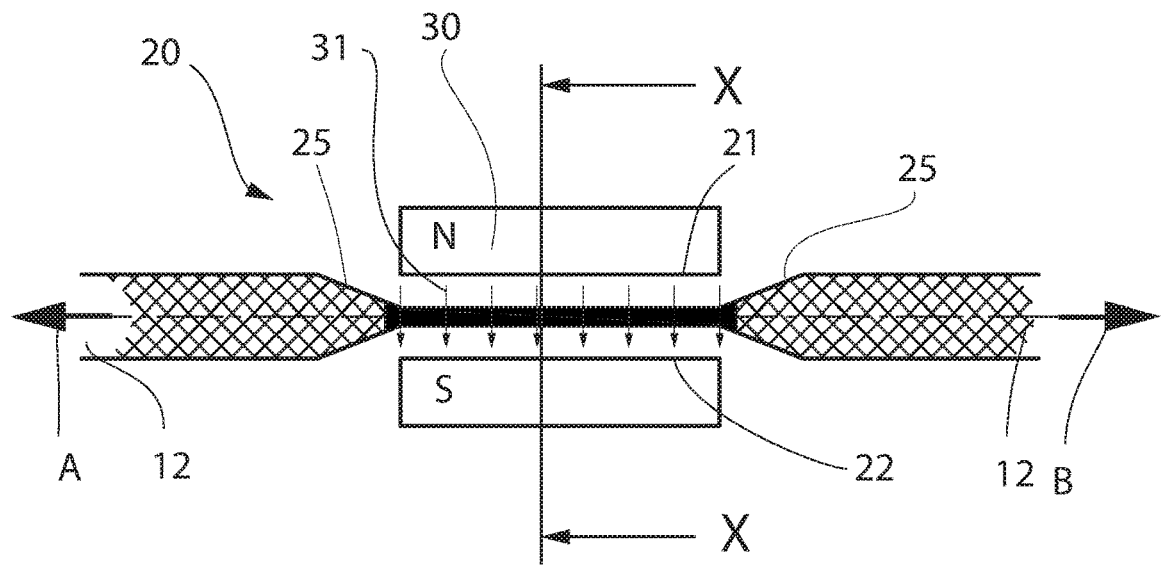
FIG. 13a shows an enlarged and greatly simplified schematic representation of an embodiment of the channel portion with the magnet device.
Figure 13B:
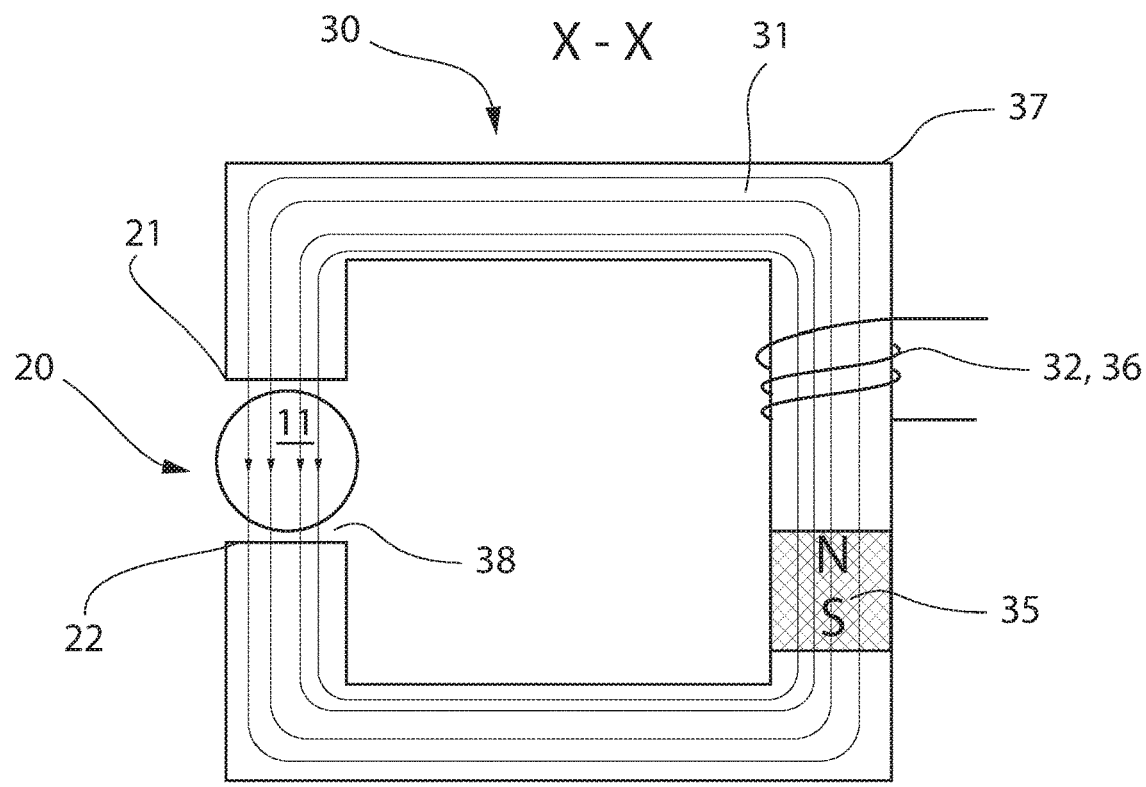
Figure 14:
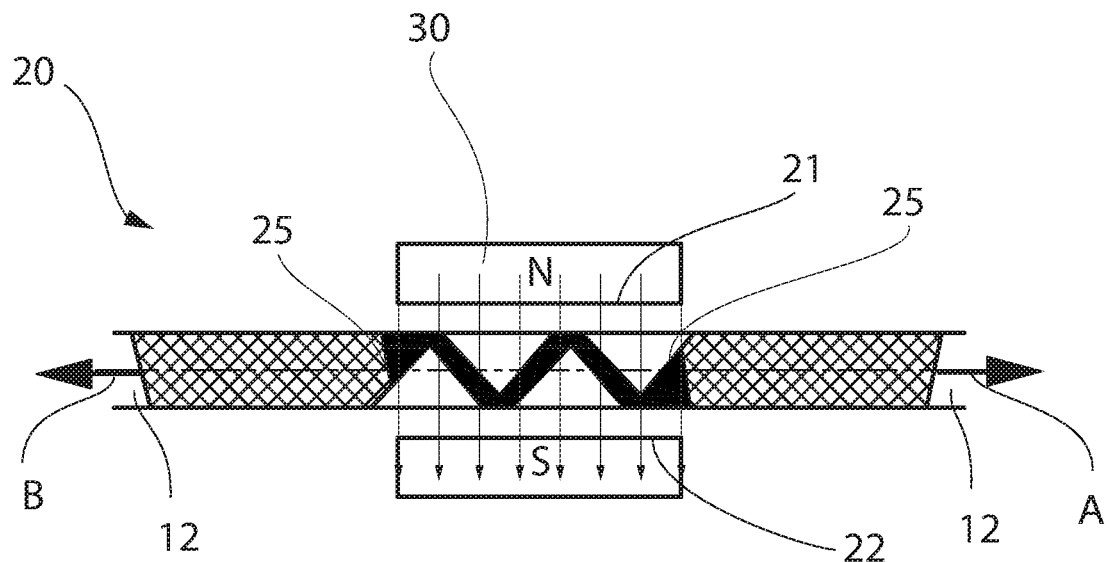
FIG. 14 shows an enlarged and greatly simplified schematic representation of a second embodiment of the channel portion with the magnet device.

According to FIG. 13b, the at least one electromagnet 36 of the second magnet unit 32 can generate a magnetic field when energized, which field cancels or weakens the magnetic field of the magnet device 30 in the channel portion 20. The magnetic field in the channel portion 20 can be canceled or weakened to such an extent that the magneto-rheological fluid 11 can flow freely through the channel portion 20.

Figure 3:
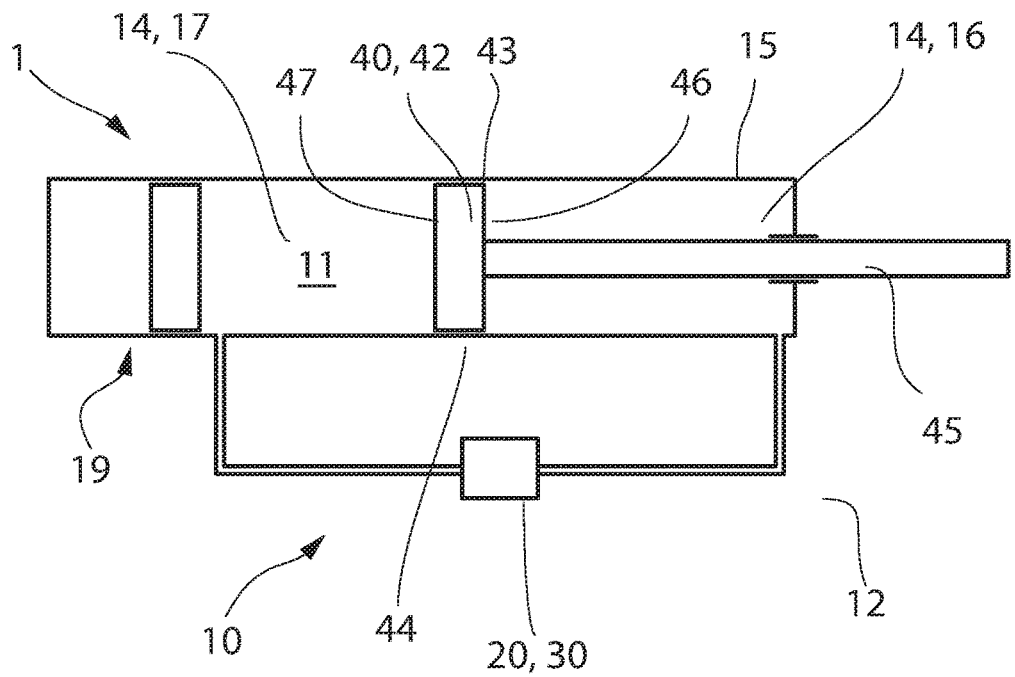
FIG. 3 shows a development of the first exemplary embodiment according to FIG. 1 or 2, wherein a pressure compensation device is provided, by means of which the pressure in the fluid channel can be kept constant.

A development of the locking device 1 is shown in FIG. 3. In contrast to the embodiment shown in FIG. 2, the pressure compensation device 19 is not arranged on the line 12 between the first region 16 and the second region 17 of the pressure chamber 14 of the cylinder 15, but is integrated into the pressure chamber 14 of the cylinder 15.

The pressure compensation device 19 comprises a compensation piston which is also arranged movably in the cylinder 15, preferably in the first region 16, and divides the pressure chamber 14 of the cylinder 15 into a further, third region. The compensation piston can have a seal, which seals a pass gap between the compensation piston and the cylinder 15. A reservoir is thus formed at a free end in the third region of the cylinder 15, in which the pressure medium can be enclosed.

Figure 4:
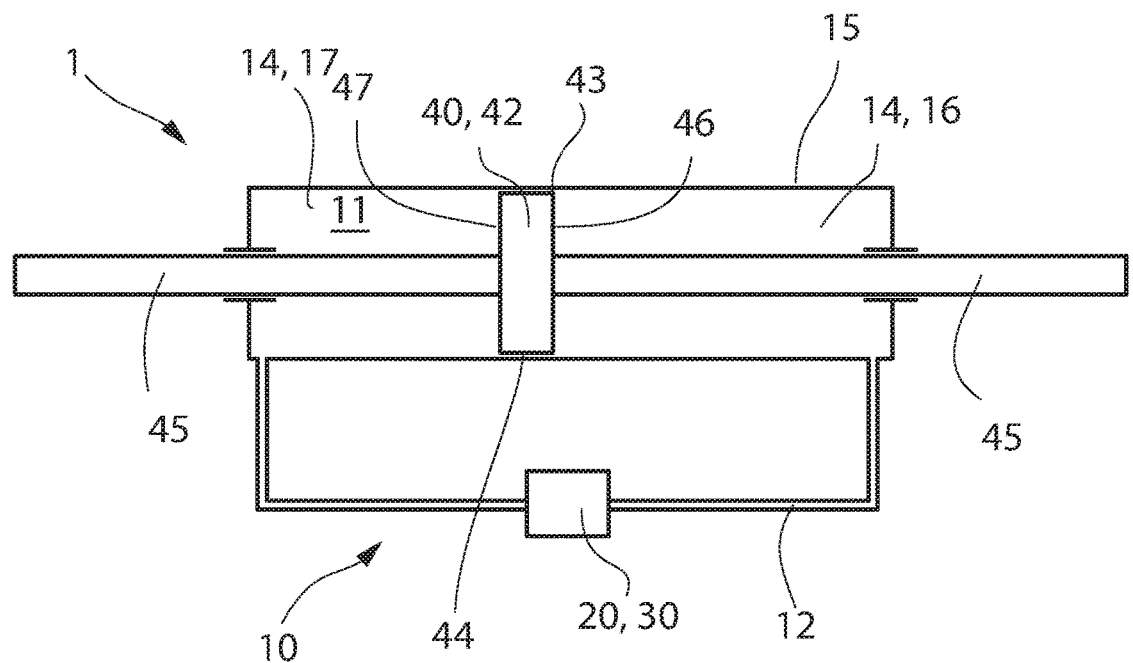
FIG. 4 shows a second development of the first exemplary embodiment according to FIG. 1 or 2.

The development according to FIG. 4 differs from the above-mentioned embodiments in that no pressure compensation device 19 is provided and in that the piston 42 has a piston rod 45 on the first pressure side 46 and on the second pressure side 47, which can be led out of the cylinder 15 through the first region 16 and through the second region 17 through the respective free ends of the cylinder 15, in each case through an opening.

Figure 5:
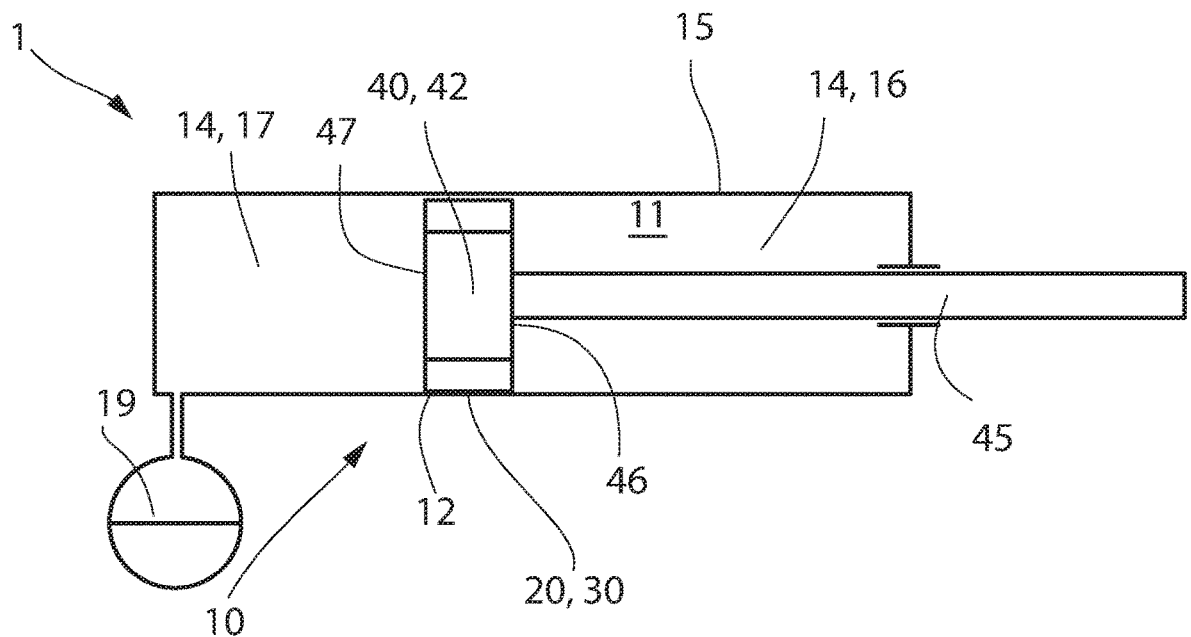
FIG. 5 shows a third development of the first exemplary embodiment according to FIG. 1 or 2.

FIG. 5 shows a development of the locking device 1 with a particularly compact structure, wherein the fluid channel 10 is integrated into the cylinder 15 or the locking element 40.

The channel portion 20 is integrated into the piston 42 or into the pass gap between the piston 42 and the cylinder 15. Furthermore, the magnet device 30 is arranged on the outer lateral surface of the piston 42 facing the cylinder 15 in such a way that the field lines of the magnetic field of the magnet device 30 pass through the pass gap 43 and the particles of the magneto-rheological fluid 11 are polarized transversely to the channel portion 20 formed by the pass gap 43. In the first state of the magnet device 30, the viscosity of the magneto-rheological fluid 11 in the pass gap is increased in such a way that it is solidified in the pass gap and blocks it. The locking element 40, which is designed as a piston 42, is thus fixed and the safety bar 8 of the passenger accommodation 3 is locked.

Figure 6:
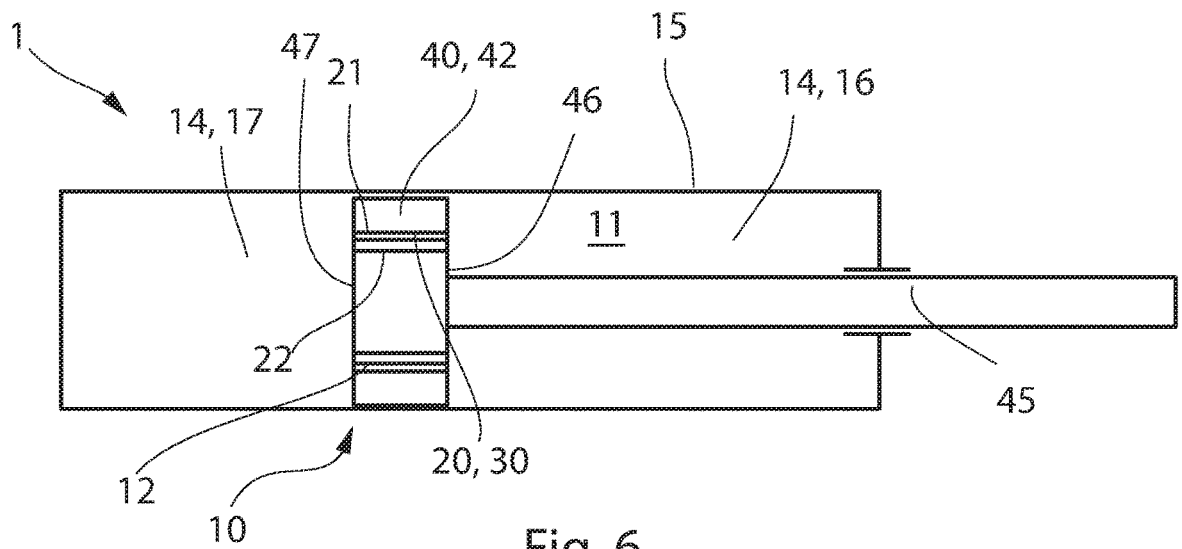
FIG. 6 shows a fourth development of the first exemplary embodiment according to FIG. 1 or 2.

Analogously to the exemplary embodiment according to FIG. 5, the fluid channel 10 is also integrated into the cylinder 15 in FIG. 6. The pass gap 43 between the piston 42 and the cylinder 15 can be sealed by means of a seal. The channel portion 20 is arranged within the piston 42 and connects the first region 16 and the second region 17 of the cylinder 15. To this end, at least one, preferably a plurality of lines 12 are arranged in the piston 42 between the outer lateral surface of the piston 42 facing the cylinder 15 and the piston rod 45, the channel portion 20 in each line 12 being arranged or formed in the manner of a passage opening within the piston 42.

The magnet device 30 is arranged on at least two opposing side walls 21, 22 of the channel portion 20 and is designed in such a way that the field lines 31 of the magnetic flux of the magnet device 30 pass through the channel portion 20, preferably transversely to the flow direction.

Figure 7:
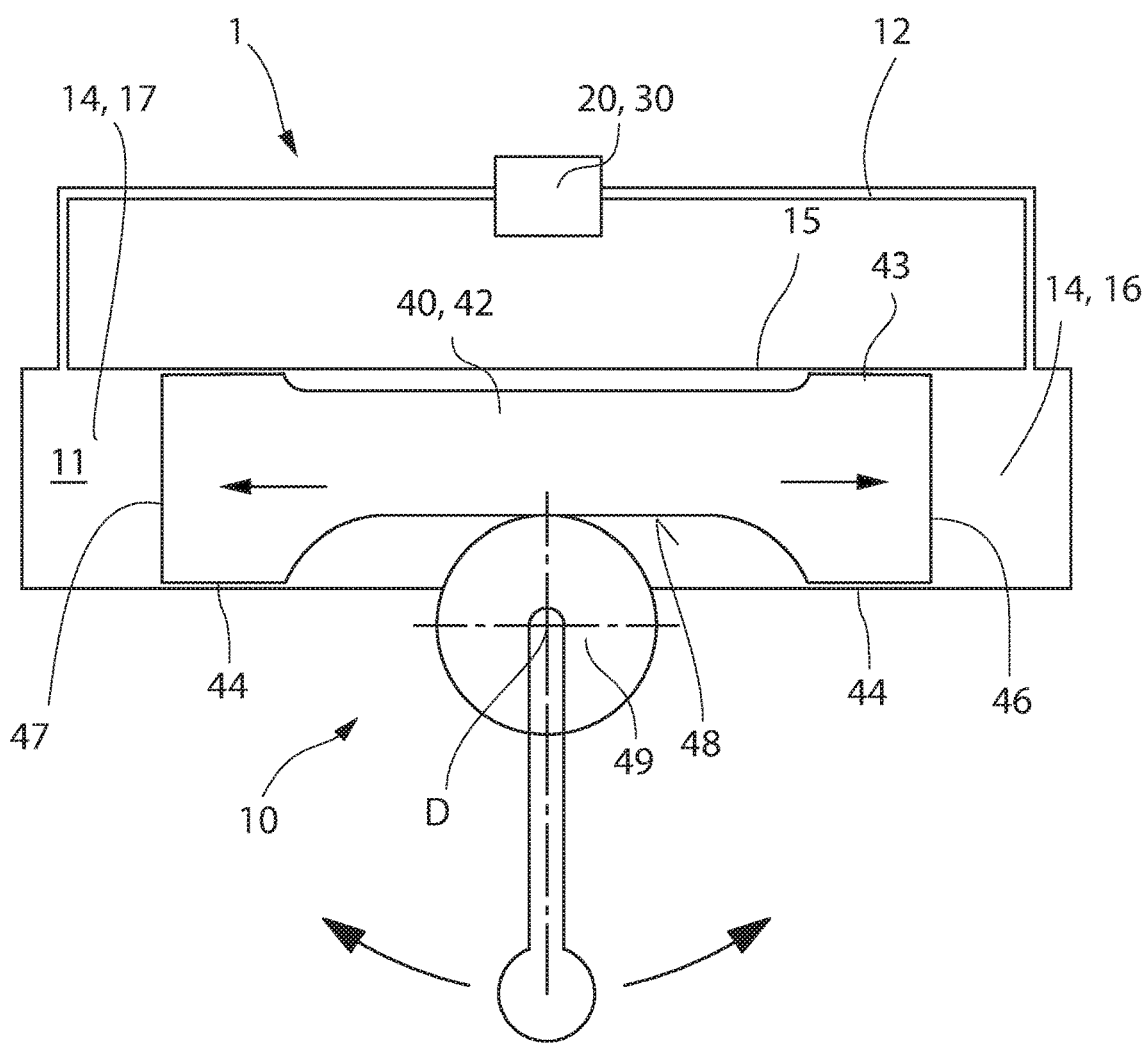
FIG. 7 shows a fifth development of the first exemplary embodiment according to FIG. 1 or 2.

Another development of the present locking device 1 can be seen in FIG. 7. The locking device 1 comprises a cylinder 15 having a piston 42 arranged in the cylinder 15, which piston, in contrast to the above-mentioned exemplary embodiments, does not have a piston rod 45, but rather teeth 48 which are formed between the first pressure side 46 and the second pressure side 47 on the outer lateral surface of the piston 42.

The pass gap 43 of the piston 42 is sealed both in the region of the first pressure side 46 and of the second pressure side 47, preferably by means of a seal, and the cylinder 15, or the cylinder housing, has a gap through which a gear 49 protrudes through the cylinder housing into the cylinder 15 and meshes with the teeth 48. The gear 49 is mounted in a rotationally movable manner and the operative connection between the gear 49 and the teeth 48 transfers a rotational movement of the gear 49 into a linear movement of the piston 42.

The piston 42 divides the cylinder 15 into the two regions 16, 17, which are assigned to the first pressure side 46 and the second pressure side 47, the two regions 16, 17 being connected by means of the line 12, and the channel portion 20 together with the magnet device 30 being arranged in the line 12.

The gear 49 can be coupled to the axis of rotation of the safety bar 8, as a result of which a rotational movement of the safety bar 8 is transferred to the piston 42. When the field lines 31 of the magnetic flux of the magnet device 30 pass through the channel portion 20, the channel portion 20 is blocked and the magneto-rheological fluid 11 cannot flow from the first region 16 of the cylinder 15 into the second region 17 and vice versa, thereby locking the position of the piston 42 or the position of the safety bar 8 and holding the safety bar 8 in its position.

Figure 8:
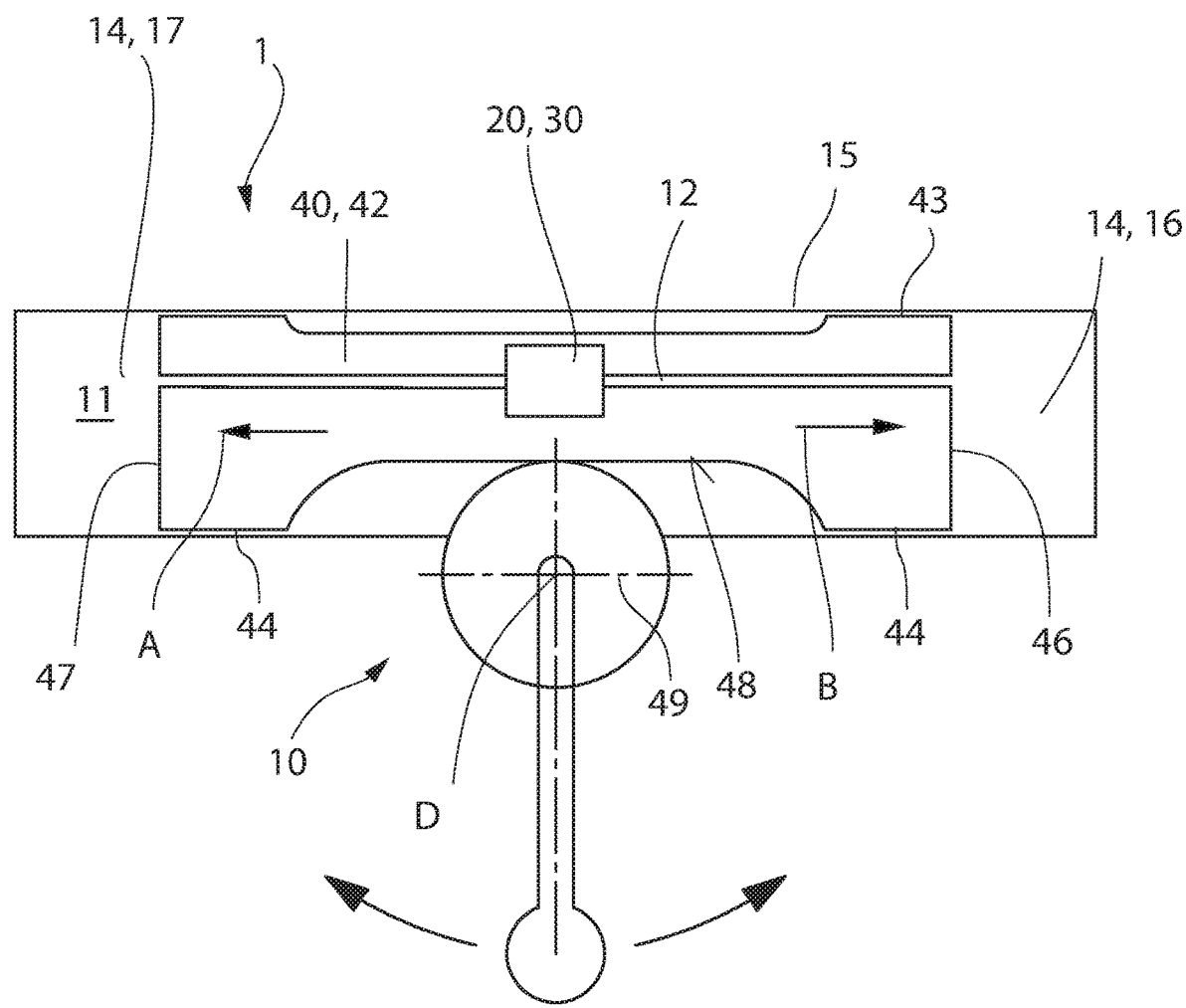
FIG. 8 shows a sixth development of the first exemplary embodiment according to FIG. 1 or 2.

FIG. 8 shows a combination of the exemplary embodiments according to FIG. 6 and FIG. 7, wherein the line 12 with the channel portion 20 is incorporated into the piston 42 according to FIG. 6 in such a way that the line 12 connects the first pressure side 46 to the second pressure side 47 of the piston 42. The fluid channel 10 is therefore completely integrated into the cylinder 15, as a result of which the locking device 1 is designed to be particularly compact and robust.

Figure 9:
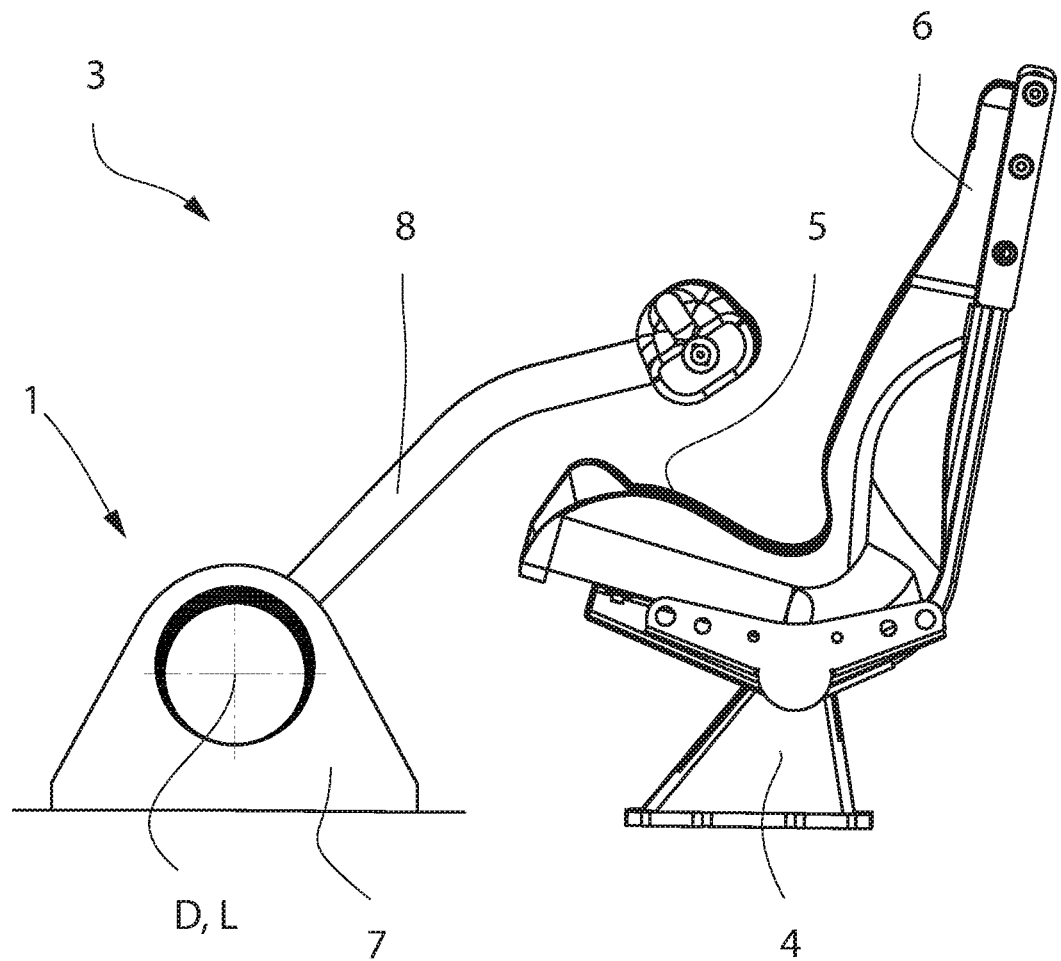
FIG. 9 shows a passenger accommodation of the amusement ride, comprising a safety bar and a locking device according to a second exemplary embodiment, wherein the fluid channel is arranged as a circular channel between an inner shaft and an outer shaft.

FIG. 9 shows a passenger accommodation 3 having a locking device 1 according to a second exemplary embodiment. The passenger accommodation 3 has the seat receptacle 4 with the seat cushion 5 and the back cushion 6 and the safety bar 8 which is arranged in front of the seat cushion 5 and designed to keep a passenger safely in the passenger accommodation 3 while traveling on the amusement ride 2. The safety bar 8 is arranged on a holder 7 such that it can rotate or pivot in the axis of rotation.

Figure 10:
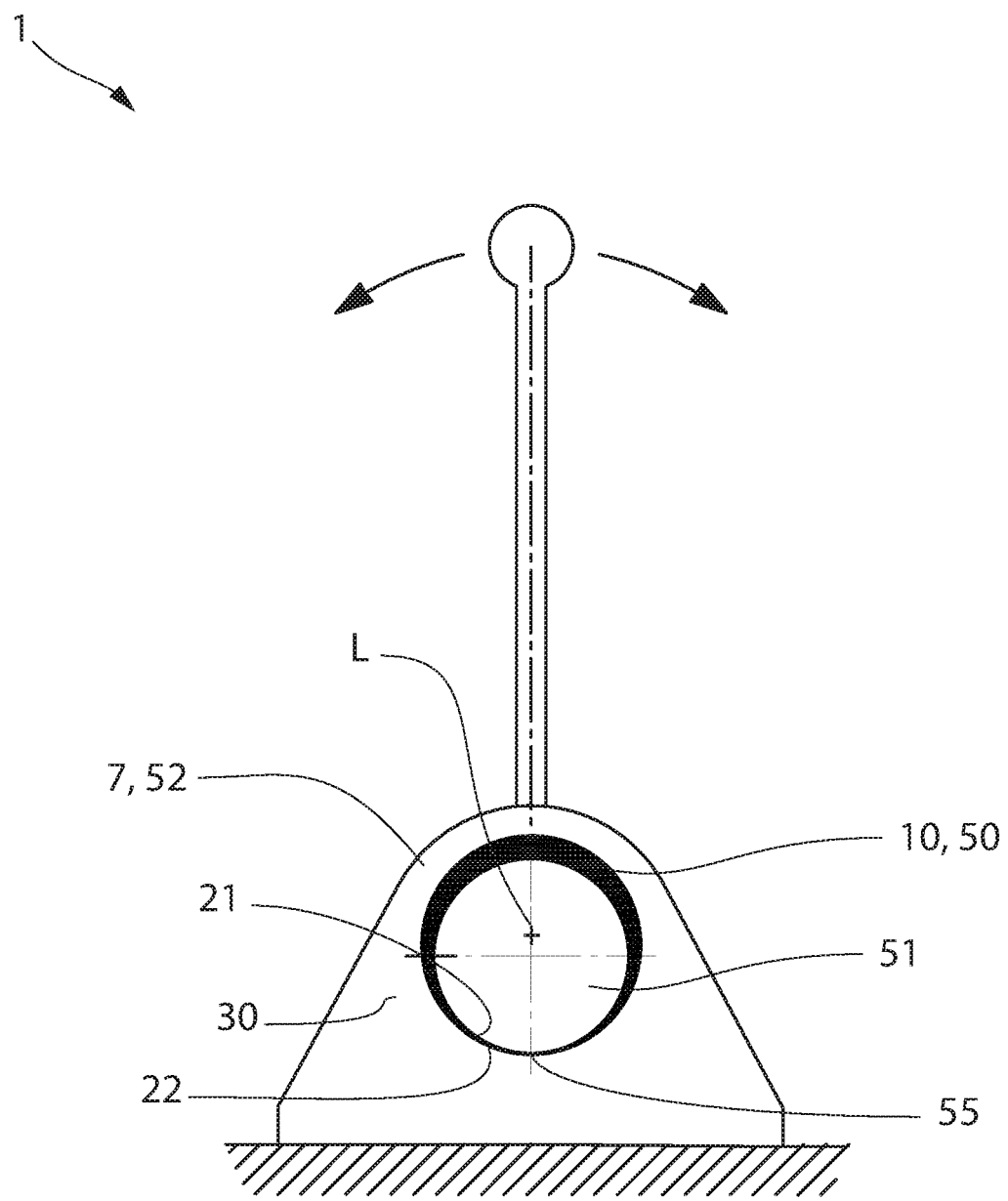
FIG. 10 shows a detailed representation of the locking device according to FIG. 9, wherein the inner shaft is arranged eccentrically with respect to the outer shaft.

A detailed view of the locking device 1 according to FIG. 9 is shown in FIG. 10, in which the fluid channel 10 is designed as a circular channel 50. The circular channel 50 forms the channel portion 20 between an inner shaft 51 and an outer shaft 52, the respective opposing side walls 21 of the channel portion 20 being formed by the inner shaft 51 and the outer shaft 52. The outer shaft 52 can be formed by a hollow shaft or cylindrical recess in the holder 7.

The inner shaft 51 forms the locking element 40 and is arranged eccentrically with respect to the outer shaft 52, as a result of which the circular channel 50 has a variable width around the circumference about the longitudinal axis L. Due to the eccentric mounting of the inner shaft 51, the channel portion 20 of the fluid channel 10 has a constriction 55, which is also displaced when the inner shaft 51 rotates.

The circular channel 50 is filled with the magneto-rheological fluid 11 and the magnet device 30 is arranged around the fluid channel 10 in such a way that the field lines 31 of the magnetic field of the magnet device 30 pass through the channel portion 20 or the circular channel 50. In the presence of the magnetic field lines, the particles in the magneto-rheological fluid 11 form chain-like solidifications along the magnetic field lines, which solidifications preferably extend substantially radially. The solidifications block in a wedge-like manner the inner shaft 51 from rotating in the magnetic field of the magnet device in the region of the constriction 55, as a result of which a rotation between the inner shaft 51 and the outer shaft 52 is prevented. The inner shaft 51 can be coupled directly or indirectly to the safety bar 8.

Figures 11A, 11B:
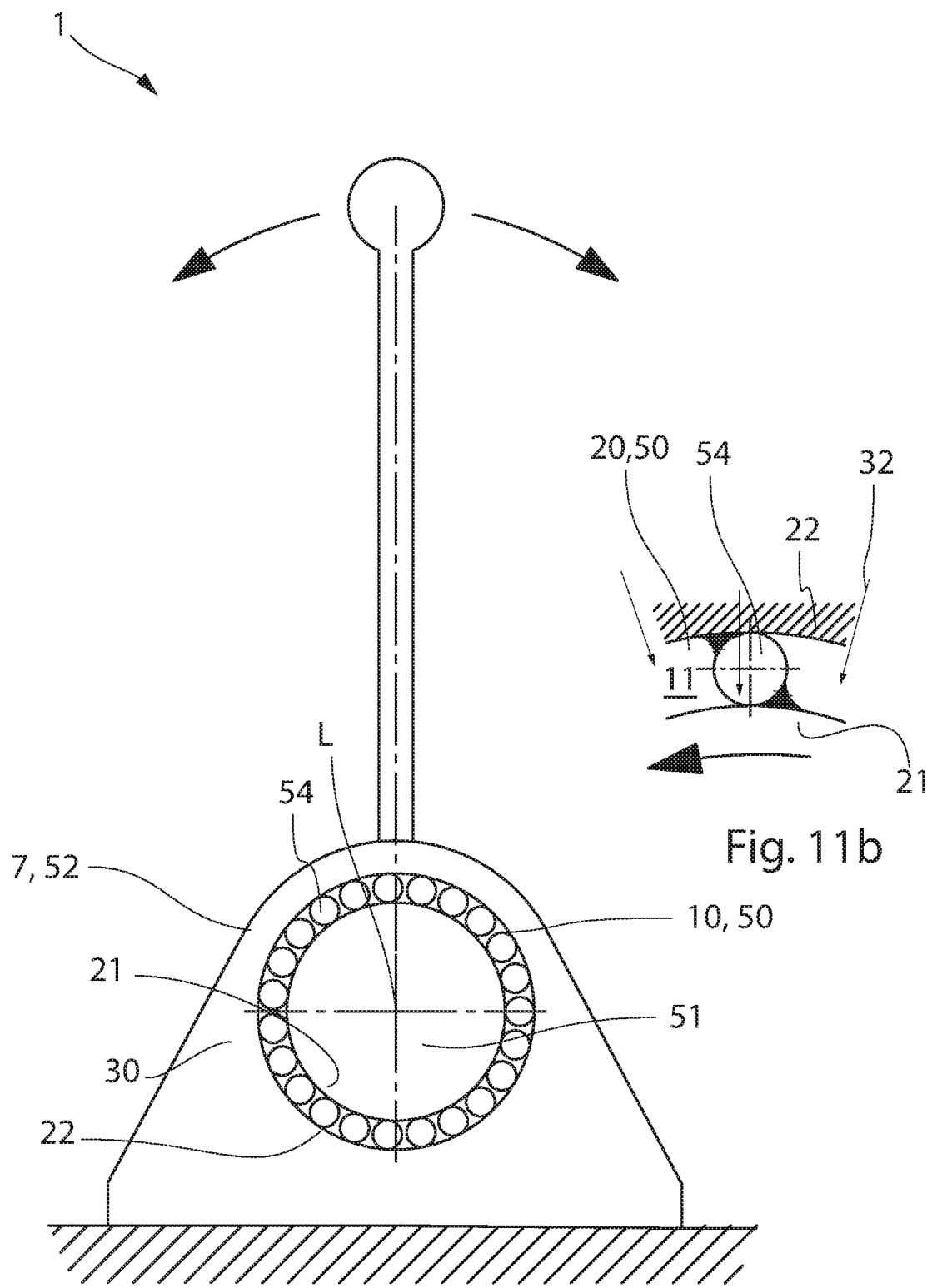

A development of the exemplary embodiment of the locking device 1 according to FIGS. 9 and 10 is shown in FIGS. 11a and 11b. The inner shaft 51 and the outer shaft 52 are arranged coaxially with one another in the longitudinal axis L. The circular channel 50 has a constant width around the circumference about the longitudinal axis L of the inner shaft 51 or the outer shaft 52.

A large number of rolling elements 54 are arranged in the circular channel 50 and, in the manner of a roller bearing, are in operative contact with the inner shaft 51 as well as in operative contact with the outer shaft 52 and perform a rolling movement when the inner shaft 51 is rotated relative to the outer shaft 52.

The circular channel 50 is filled with the magneto-rheological fluid 11 and the magnet device 30 is arranged around the fluid channel 10 in such a way that the field lines 31 of the magnetic field of the magnet device 30 pass through the channel portion 20 or the circular channel 50. In the presence of the magnetic field lines, the particles in the magneto-rheological fluid 11 form solidifications along the magnetic field lines. As shown in FIG. 11b, the solidifications block the rolling elements 54, thereby blocking a rotation of the inner shaft 51. The inner shaft 51 can be coupled directly or indirectly to the safety bar 8.

Figures 12A, 12B:
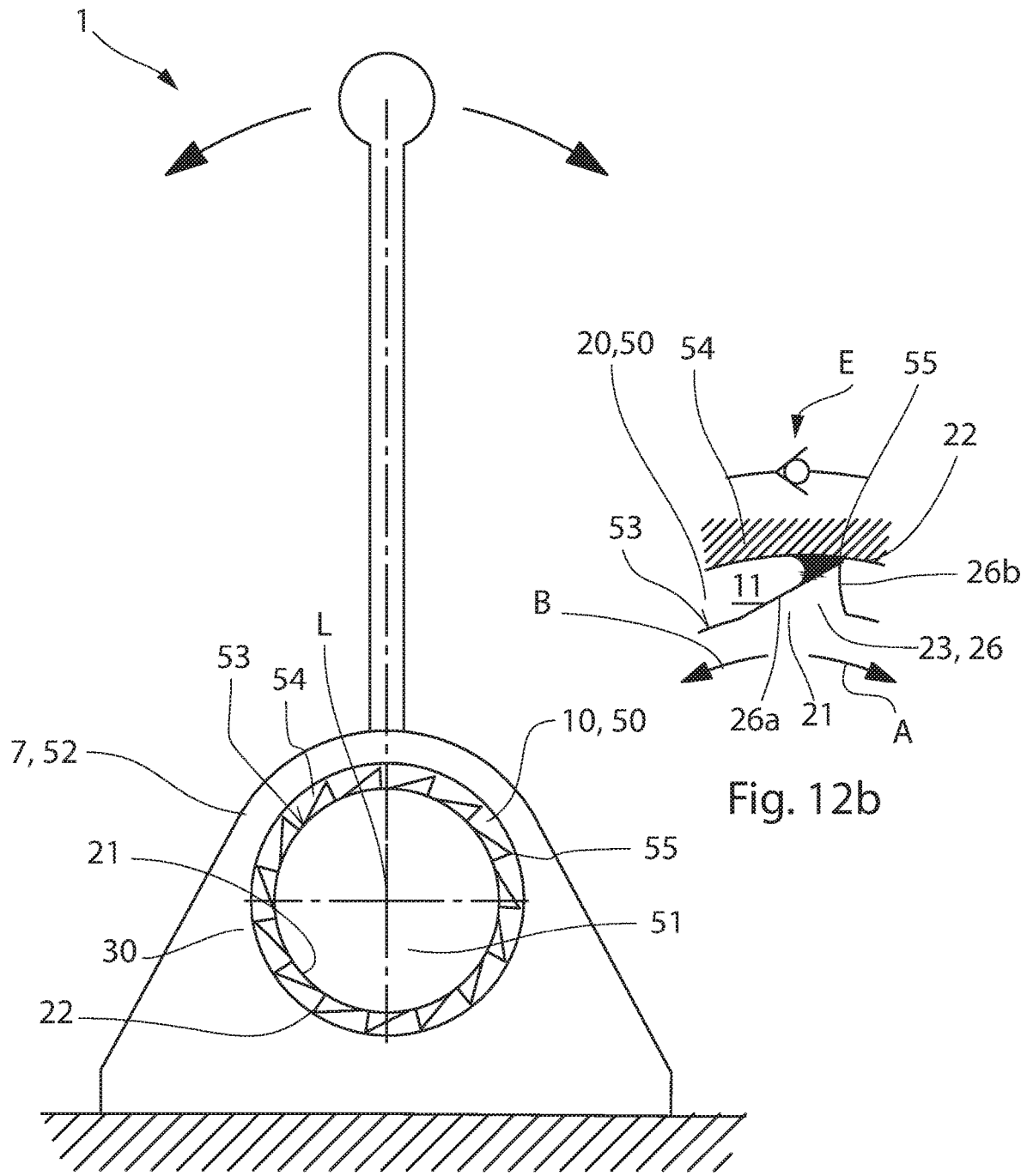

FIG. 12a shows a third development of the second exemplary embodiment of the locking device 1, the inner shaft 51 and the outer shaft 52 being aligned and mounted coaxially with respect to each other analogously to the exemplary embodiment shown in FIGS. 11a and 11b, and the fluid channel 10 is formed as a circular channel 50 between the inner shaft 51 and the outer shaft 52. A large number of throttles 23 are arranged on an outer lateral surface 53 of the inner shaft 51 and protrude from the outer lateral surface 53 of the inner shaft 51 in the direction of the outer shaft 52. Each throttle 23 is designed as a link 26, each link 26 being formed from a first flank 26a and a second flank 26b. The first flank 26a extends approximately tangentially from the outer lateral surface 53 and the second flank 26b extends approximately radially. The first flank 26a and the second flank 26b meet at a point which forms a constriction 55 and thus constitutes the narrowest cross section of the fluid channel 10.

The particles of the magneto-rheological fluid 11 polarized along the magnetic field lines 31 of the magnetic field of the magnet device 30 are forced by the second flank into the narrowest cross section like a wedge when the inner shaft 51 rotates in a first direction according to FIG. 10b and block a further rotation in the first direction A. In contrast, even in the presence of the magnetic field in the fluid channel 10, a rotation in the second direction B according to FIG. 12b is not completely blocked, but merely damped. As soon as the magnetic field of the magnet device 30 is deflected, weakened or destroyed, the inner shaft 51 can be rotated unhindered both in a first direction A' and in a second direction B'. The locking device 1 therefore forms a freewheel in the first state. The freewheel can be used, for example, to block a pivoting of the safety bar 8 in the first direction A'; the first direction A' would cause the safety bar 8 to be opened and the second direction B would cause the safety bar 8 to be closed. Therefore, while traveling on an amusement ride 2, the passenger cannot open the safety bar 8, but can readjust the safety bar 8 so that it holds them even more securely in the passenger accommodation 3.

Detailed representations of different embodiments of the channel portion 20 can be seen in FIGS. 13a to 17. For a better understanding, some of the detailed representations are provided with circuit signals E, which reflect a function of the channel portion 20.

A detail of the line 12 of the fluid channel 10 with the channel portion 20 and the magnet device 30 is shown in FIGS. 13a and 13b. The magnet device 30 is arranged on at least two opposing side walls 21, 22 around the channel portion 20, as a result of which the magnetic field lines 31 of the magnetic field of the magnet device 30 pass through the channel portion 20.

As shown in FIG. 13b, the magnet device 30 can comprise a magnetically soft iron circuit 37 with an air gap 38, wherein the channel portion 20 is arranged in the air gap 38. The magnet device 30 can also have at least one permanent magnet 35 which introduces a magnetic flux into the iron circuit 37, the field lines 31 of which pass through the channel portion 20 in the air gap 38. Furthermore, a coil which can be supplied with electrical energy and which forms the second magnet unit 32 can be arranged on the iron circuit 37.

Upstream and downstream of the channel portion 20, a tapered portion 25 is arranged which forms a cross-sectional reduction or expansion, as a result of which, in comparison with the remaining line 12, the channel portion 20 has a reduced flow cross section which is preferably less than ½, more preferably less than ¼, even more preferably less than ⅛ or even less than 1/16.

The embodiment of the channel portion 20 according to FIG. 12 has a throttle 23 which is formed by a cascade. By means of the cascade, the magneto-rheological fluid 11 is guided through a tapered cross section. By means of the multiple deflection, the effective length of the channel portion 20 is extended, thereby further increasing the blocking effect in the channel portion 20 when the magnet device 30 is in the first state.

Figure 15:
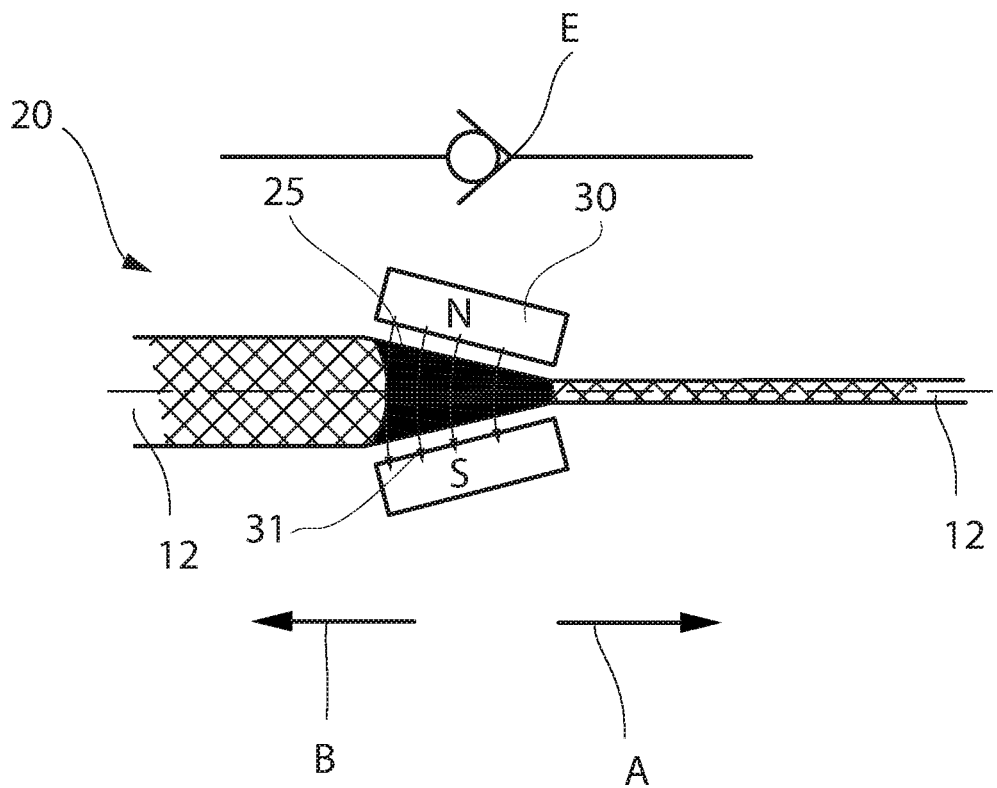
FIG. 15 shows an enlarged and greatly simplified schematic representation of a third embodiment of the channel portion with the magnet device, the channel portion having a tapered portion and being designed in the manner of a non-return valve.

A further embodiment of the channel portion 20 can be seen in FIG. 15, in which the channel portion 20 has a cross-sectional taper through a tapered portion 25 along the first flow direction A. The tapered portion 25 tapers the flow channel in the first flow direction A and widens the flow channel in the second flow direction B. This embodiment of the channel portion 20 forms a kind of one-way valve. The channel portion 20 blocks in the first flow direction A, during which time the second flow direction B is released in a damped manner. This effect is due to the fact that the polarized particles or the solidifications formed by the particles clog or block in the magnetic field in the second flow direction A due to the wedge action of the nozzle of the channel portion 20.

The magnet device 30 can be a conically diametrically magnetized permanent magnet, the magnetic field lines passing through the channel portion 20 in a slightly curved manner, thereby enhancing the characteristics of the freewheel.

Figure 16:
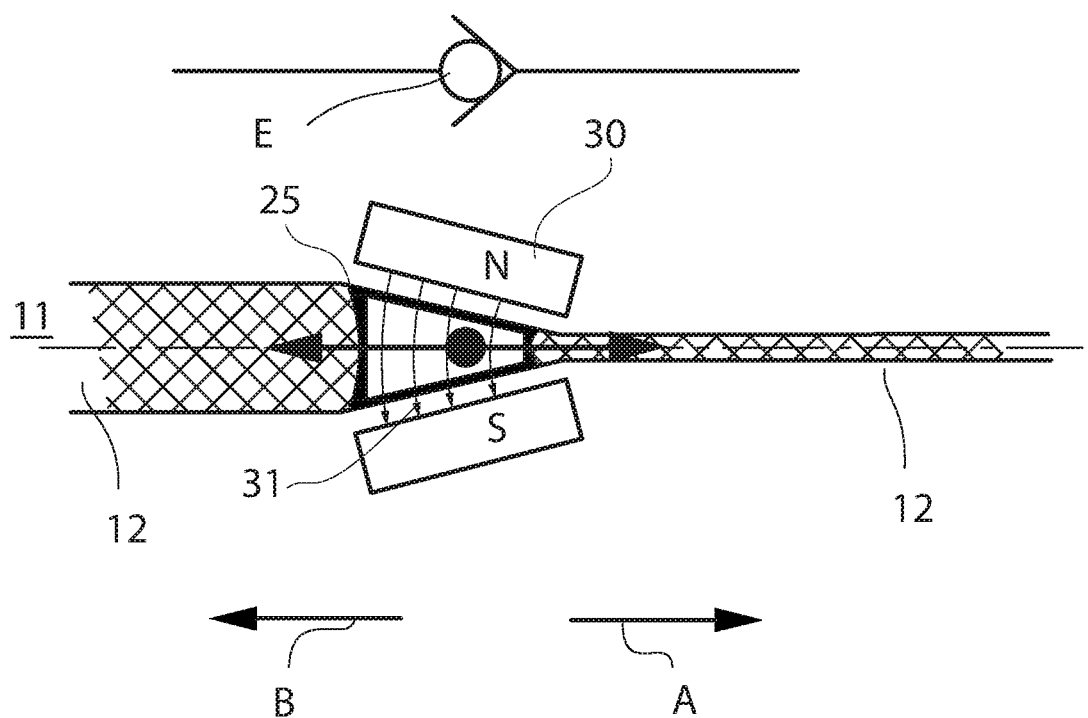
FIG. 16 shows an enlarged and greatly simplified schematic representation of a fourth embodiment of the channel portion with the magnet device.
Figure 17:
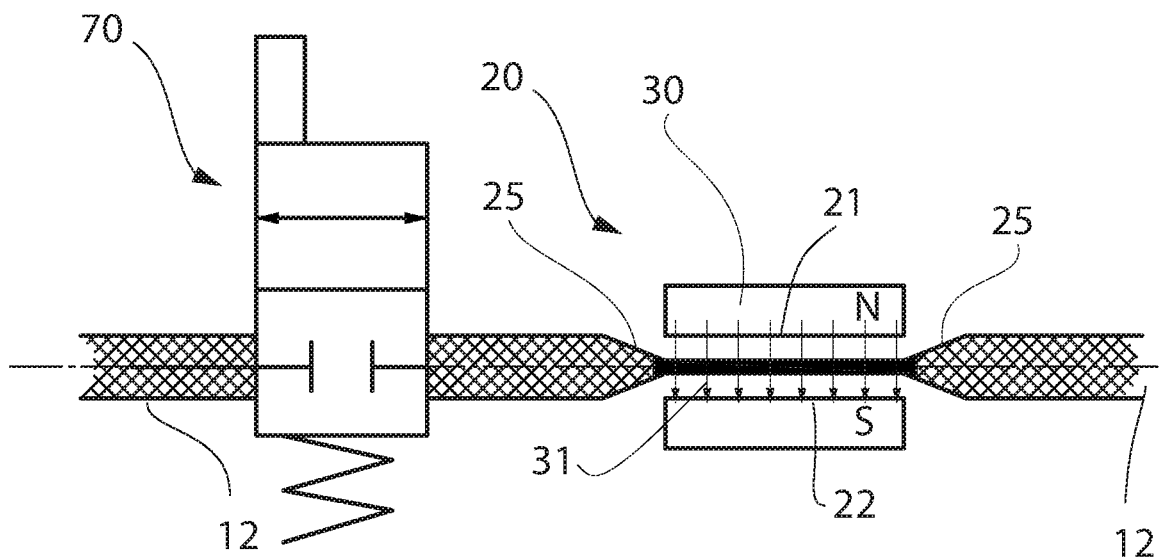
FIG. 17 shows an enlarged and greatly simplified schematic representation of the channel portion according to FIG. 13a, wherein an additional hydraulic valve is provided.

A development of the channel portion 20 according to FIG. 15 is shown in FIG. 16, wherein the tapered portion 25 and/or the magnet device 30 is movable in the first flow direction A or the second flow direction B. By means of the variable relative position between the tapered portion 25 and the magnet device 30, the properties of the channel portion 20 or the properties of the one-way valve thus formed can be adjusted.

A movable tapered portion (not shown) can also be arranged in the magneto-rheological fluid 11 in the inner (flown-through) area of the tapered portion 25, and, depending on the flow direction of the magneto-rheological fluid 11, either mechanically tapers the tapered portion 25 or is pushed out of the tapered portion 25, thus reducing the blocking effect. By means of the movable tapered portion within the channel portion 20, the characteristics of the one-way or non-return valve can be improved.

In addition, the channel portion 20 can have a conventional hydraulic valve 70. By combining the channel portion 20 with a conventional hydraulic valve 70, valve leakage can be accomplished by reducing the pressure acting on the hydraulic valve 70 through the channel portion 20. The channel portion 20 thus forms a leakage safeguard for the hydraulic valve 70.

LIST OF REFERENCE NUMERALS

1 Locking device
2 Amusement ride
3 Passenger accommodation
4 Seat receptacle
5 Seat cushion
6 Back cushion
7 Holder
8 Safety bar
10 Fluid channel
11 Fluid
12 Line
14 Pressure chamber
15 Cylinder
16 First region
17 Second region
18 Conveying means
19 Pressure compensation device
20 Channel portion
21 Side wall
22 Side wall
23 Throttle
25 Tapered portion
26 Link
30 Magnet device
31 Field lines
32 Second magnet unit
35 Permanent magnet
36 Electromagnet
37 Iron circuit
38 Air gap
40 Locking element
42 Piston
43 Pass gap
44 Seal
45 Piston rod
46 First pressure side
47 Second pressure side
48 Teeth
49 Gear
50 Circular channel
51 Inner shaft
52 Outer shaft
53 Lateral surface
54 Rolling element
55 Constriction
70 Hydraulic valve
A First flow direction
B Second flow direction
D Axis of rotation
L Longitudinal axis

The invention claimed is:

1. A locking device (1) for a safety bar (8), comprising:
a fluid channel (10) having a magneto-rheological fluid (11), a movable locking element (40) and a magnet device (30),
wherein the locking element (40) is configured to be coupled to the safety bar (8) and a movement of the safety bar (8) transfers to the fluid (11) in the fluid channel (10),
wherein the fluid channel (10) has at least one channel portion (20), and wherein the magnet device (30) is arranged at least on opposing side walls (21) of the channel portion (20) in such a manner that the field lines (31) of the magnetic field of the magnet device (30) can pass through the channel portion (20).

2. The locking device (1) according to claim 1, characterized in that the magnet device (30) has a first state and a second state, wherein the magnetic field lines (31) pass through the channel portion (20) in the first state and wherein the magnetic field lines (31) are diverted or deflected by the channel portion (20) or weakened in the channel portion (20) in the second state.

3. The locking device (1) according to claim 1, characterized in that the magnet device (30) completely or partially surrounds the channel portion (20).

4. The locking device (1) according to claim 1, characterized in that the magnet device (30) can be switched or actuated mechanically and/or electrically.

5. The locking device (1) according to claim 1, characterized in that the magnet device (30) has at least one permanent magnet (35) and/or at least one electromagnet (36).

6. The locking device (1) according to claim 1, characterized in that the channel portion (20) has at least one throttle (23), as a result of which the channel portion (20) of the fluid channel (10) has a locally reduced cross section.

7. The locking device (1) according to claim 6, characterized in that the throttle (23) has a cascade, a perforated sheet, a honeycomb structure, a sieve structure and/or a lattice structure.

8. The locking device (1) according to claim 1, characterized in that the channel portion (20) has at least one tapered portion (25) in the form of a diffuser and/or a nozzle.

9. The locking device (1) according to claim 1, characterized in that the locking element (40) comprises a linearly movable piston (42).

10. The locking device (1) according to claim 1, characterized in that the fluid channel (10) is a circular channel (50), the circular channel (50) being formed between an inner shaft (51) and an outer shaft (52).

11. The locking device (1) according to claim 10, characterized in that the inner shaft (51) or the outer shaft (52) form the movable locking element (40) and can rotate about a longitudinal axis (L).

12. The locking device (1) according to claim 10, characterized in that at least one rolling element (54) is arranged in the circular channel (50).

13. The locking device (1) according to claim 1, characterized in that the fluid channel (10) has a conveying means (18) through which the fluid (11) can circulate in the fluid channel (10) under pressure.

14. The locking device (1) according to claim 1, characterized in that the fluid channel (10) has at least one pressure compensation device (19).

15. The locking device (1) according to claim 1, characterized in that the magneto-rheological fluid contains polarizing particles, in particular carbonyl iron powder, and a suspension, in particular a mineral oil, a synthetic oil, ethylene glycol or water.

16. A use of a locking device (1) for a safety bar (8) according to claim 1 in an amusement ride, in particular a roller coaster, a carousel, a swing or a water ride.

17. A passenger accommodation (3) having a safety bar (8) and a locking device (1) according to claim 1.

18. An amusement ride (2), in particular a roller coaster, a carousel, a swing or a water ride, comprising a safety bar (8) and a locking device (1) for the safety bar (8) according to claim 1.

* * * * *